(12) United States Patent
Pan

(10) Patent No.: US 10,531,364 B2
(45) Date of Patent: Jan. 7, 2020

(54) WIRELESS NETWORK ACCESS METHOD AND ACCESS APPARATUS, CLIENT AND STORAGE MEDIUM

(71) Applicant: ZTE Corporation, Shenzhen, Guangdong (CN)

(72) Inventor: Wanpeng Pan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 245 days.

(21) Appl. No.: 15/528,160

(22) PCT Filed: Apr. 14, 2015

(86) PCT No.: PCT/CN2015/076563
§ 371 (c)(1),
(2) Date: May 19, 2017

(87) PCT Pub. No.: WO2016/078301
PCT Pub. Date: May 26, 2016

(65) Prior Publication Data
US 2017/0332307 A1 Nov. 16, 2017

(30) Foreign Application Priority Data
Nov. 20, 2014 (CN) .......................... 2014 1 0669643

(51) Int. Cl.
*G06F 15/16* (2006.01)
*H04W 48/08* (2009.01)
(Continued)

(52) U.S. Cl.
CPC ......... *H04W 48/08* (2013.01); *H04L 63/0876* (2013.01); *H04W 12/06* (2013.01); *H04W 48/16* (2013.01)

(58) Field of Classification Search
USPC .................. 709/225, 217, 202, 223, 224
See application file for complete search history.

(56) References Cited

U.S. PATENT DOCUMENTS

| 7,043,230 B1 | 5/2006 | Geddes |
| 2002/0037708 A1 | 3/2002 | McCann |

(Continued)

FOREIGN PATENT DOCUMENTS

| CN | 203340307 U | 12/2013 |
| CN | 103929748 A | 7/2014 |

(Continued)

OTHER PUBLICATIONS

International Search Report in international application No. PCT/CN2015/076563, dated Aug. 19, 2015, 2 pgs.

(Continued)

*Primary Examiner* — Lan Dai T Truong

(57) ABSTRACT

Disclosed in the present invention are a wireless network access method and an apparatus, and the method includes: obtaining the identification information of a client to be accessed; according to the identification information, querying a communication terminal having a binding relationship with the identification information; generating a matching verification code; transmitting the matching verification code to the communication terminal; receiving a return verification code transmitted from the client to be accessed; and according to the matching verification code and the return verification code, allowing or refusing the access of the client to be accessed. Meanwhile, the present invention also discloses a computer storage medium.

16 Claims, 8 Drawing Sheets

(51) Int. Cl.
*H04W 12/06* (2009.01)
*H04L 29/06* (2006.01)
*H04W 48/16* (2009.01)

(56) References Cited

U.S. PATENT DOCUMENTS

| | | | |
|---|---|---|---|
| 2008/0120707 A1* | 5/2008 | Ramia | H04L 63/0861 |
| | | | 726/5 |
| 2009/0055892 A1* | 2/2009 | Lu | H04L 9/3226 |
| | | | 726/2 |
| 2009/0249457 A1 | 10/2009 | Graff | |
| 2013/0160104 A1* | 6/2013 | Carlson | G06F 21/31 |
| | | | 726/7 |
| 2013/0263234 A1 | 10/2013 | Givoni et al. | |
| 2014/0328250 A1 | 11/2014 | Hardy et al. | |
| 2015/0373016 A1* | 12/2015 | Gupta | H04L 63/0853 |
| | | | 726/9 |
| 2017/0310685 A1* | 10/2017 | Zhao | G06Q 20/40 |

FOREIGN PATENT DOCUMENTS

| | | |
|---|---|---|
| CN | 103945380 A | 7/2014 |
| CN | 104135753 A | 11/2014 |
| EP | 1191763 A2 | 3/2002 |
| EP | 2800338 A1 | 11/2014 |

OTHER PUBLICATIONS

English Translation of the Written Opinion of the International Search Authority in international application No. PCT/CN2015/076563, dated Aug. 19, 2015, 7 pgs.

Supplementary European Search Report in European application No. 15861072.5, dated Aug. 22, 2017, 8 pgs.

* cited by examiner

WIRELESS NETWORK ACCESS METHOD AND ACCESS APPARATUS, CLIENT AND STORAGE MEDIUM

TECHNICAL FIELD

The present disclosure relates to wireless access in the field of communication, and in particular to a method and device for wireless network access, a station (STA), and a computer-readable storage medium.

BACKGROUND

A Wireless Local Area Network (WLAN) has become an essential part of daily work and life. With a WLAN, people may check mail, chat on WeChat, browse Weibo, watch a video, browse news, etc. anytime anywhere, such as at home, on the way to work, in office, and the like.

While greatly facilitating daily work and life, a WLAN is subject to greater risk of being hacked compared with a wired network, due to openness of a WLAN channel. Therefore, security issue has been a major factor hindering development of WLAN.

To secure a WLAN, Institute of Electrical and Electronics Engineers (IEEE) has proposed various technologies for wireless network encryption, such as that for filtering a Media Access Control (MAC) address.

By MAC address filtering, it is verified whether a MAC address of a client station (STA) is legal. A STA with a legal MAC address is deemed as a legal STA. A legal STA is allowed to access a network. Network access by an illegal STA is refused.

However, in a specific application, a legal MAC address may be stolen by intercepting a wireless frame between an Access Point (AP) and equipment with a legal MAC address using MAC address changing software such as MacChanger. Illegal equipment may then access a wireless network and steal a network resource by tampering a MAC address thereof with the stolen legal MAC address.

It thus may be seen that although security in wireless network resource utilization may be enhanced and network resource theft may be prevented to some extent by verifying a MAC address, there is still a serious issue of security and theft of bandwidth resources of a wireless network.

SUMMARY

In view of this, embodiments herein provide a method and device for wireless network access, a STA, and a computer-readable storage medium, capable of reducing probability of illegal access and improving security in wireless network access.

To this end, a technical solution herein may be implemented as follows.

According to a first aspect herein, a method for wireless network access includes:
acquiring identification information of a station (STA) requesting access;
searching, according to the identification information, for a communication terminal corresponding to the identification information;
generating a verification code, and sending the verification code to the communication terminal;
receiving a returned code returned by the STA; and
granting or rejecting, according to the verification code and the returned code, access by the STA.

The searching, according to the identification information, for a communication terminal corresponding to the identification information may include:
determining, according to the identification information, whether the STA is a legal STA; and
in response to determining that the STA is a legal STA, searching, according to the identification information, for the communication terminal corresponding to the identification information.

The acquiring the identification information of the STA may include:
receiving a probe frame sent by the STA; and
extracting the identification information contained in the probe frame.

The determining, according to the identification information, whether the STA is a legal STA may include:
after receiving the probe frame, determining whether the identification information matches legal identification information;
in response to determining that the identification information matches the legal identification information, determining that the STA is legal;
in response to determining that the identification information matches no legal identification information, determining that the STA is illegal.

The granting or rejecting, according to the verification code and the returned code, access by the STA may include:
determining whether the returned code matches the verification code;
in response to determining that the returned code matches the verification code, granting access by the STA.

The granting or rejecting, according to the verification code and the returned code, access by the STA may further include:
in response to determining that the returned code does not match the verification code, rejecting access by the STA.

The granting or rejecting, according to the verification code and the returned code, access by the STA may include:
determining whether the returned code matches a verification code; and
in response to determining that the returned code matches at least one verification code, granting access by the STA.

The granting or rejecting, according to the verification code and the returned code, access by the STA may further include:
in response to determining that the returned matches no verification code sent to any of the communication terminal, rejecting access by the STA.

The method may further include:
after sending the verification code to the communication terminal, starting a timer. The verification code may expire when a specified period of time expires.

The granting or rejecting, according to the verification code and the returned code, access by the STA may include:
determining whether the verification code has expired;
in response to determining that the verification code is unexpired and that the returned code matches the verification code, granting access by the STA; otherwise in response to determining that the verification code has expired and/or that the returned code fails to match the verification code, rejecting access by the STA.

The sending the verification code to the communication terminal may include:
sending the communication terminal a short message containing the verification code.

According to a second aspect herein, a method for wireless network access includes:

sending, by a station (STA), identification information to a device for wireless network access;

acquiring, by the STA, a verification code generated by the device for wireless network access and sent by a communication terminal corresponding to the identification information; and returning, by the STA, the verification code to the device for wireless network access as a returned code.

The device for wireless network access grants or rejects access by the STA according to the returned code.

According to a third aspect herein, a device for wireless network access includes:

a first acquiring unit arranged for: acquiring identification information of a station (STA) requesting access;

a searching unit arranged for: searching, according to the identification information, for a communication terminal corresponding to the identification information;

a generating unit arranged for: generating a verification code;

a first sending unit arranged for: sending the verification code to the communication terminal;

a receiving unit arranged for: receiving a returned code returned by the STA; and an accessing unit arranged for: granting or rejecting, according to the verification code and the returned code, access by the STA.

The searching unit may include:

a determining module arranged for: determining, according to the identification information, whether the STA is a legal STA; and a searching module arranged for: in response to determining that the STA is a legal STA, searching, according to the identification information, for the communication terminal corresponding to the identification information.

The accessing unit may include:

a first matching module arranged for: determining whether the returned code matches the verification code; and a first accessing module arranged for: in response to determining that the returned code matches the verification code, granting access by the STA.

The first accessing module may be further arranged for: in response to determining that the returned code does not match the verification code, rejecting access by the STA.

The accessing unit may include:

a second matching module arranged for: determining whether the returned code matches a verification code; and a second accessing module arranged for: in response to determining that the returned code matches at least one verification code, granting access by the STA.

The second accessing module may be further arranged for: in response to determining that the returned matches no verification code sent to any of the communication terminal, rejecting access by the STA.

The first sending unit may be arranged for: sending the communication terminal a short message containing the verification code.

According to a fourth aspect herein, a station (STA) includes:

a second sending unit arranged for: sending identification information to a device for wireless network access; and a second acquiring unit arranged for: acquiring a verification code generated by the device for wireless network access and sent by a communication terminal corresponding to the identification information.

The second sending unit is further arranged for: returning the verification code to the device for wireless network access as a returned code.

The device for wireless network access grants or rejects access by the STA according to the returned code.

According to a fifth aspect herein, a computer-readable storage medium stores therein computer-executable instructions for executing at least one aforementioned method.

With a method and device for wireless network access, a STA, and a computer-readable storage medium according to at least one embodiment herein, a verification code is generated and sent. An illegal user cannot acquire the verification code through a communication terminal having a binding relationship with a legal STA, and therefore cannot access a corresponding device for wireless network access. It is difficult for the illegal user trying to access a network illegally to get a hold of the communication terminal of a legal user, thereby increasing difficulty in illegal access, reducing probability of illegal access, enhancing security in wireless network access.

DETAILED DESCRIPTION

A technical solution herein may be elaborated below with reference to accompanying drawings and embodiments. Note that embodiments described below are but for illustrating the present disclosure and not intended to limit the present disclosure.

Method Embodiment 1

Figure 1:
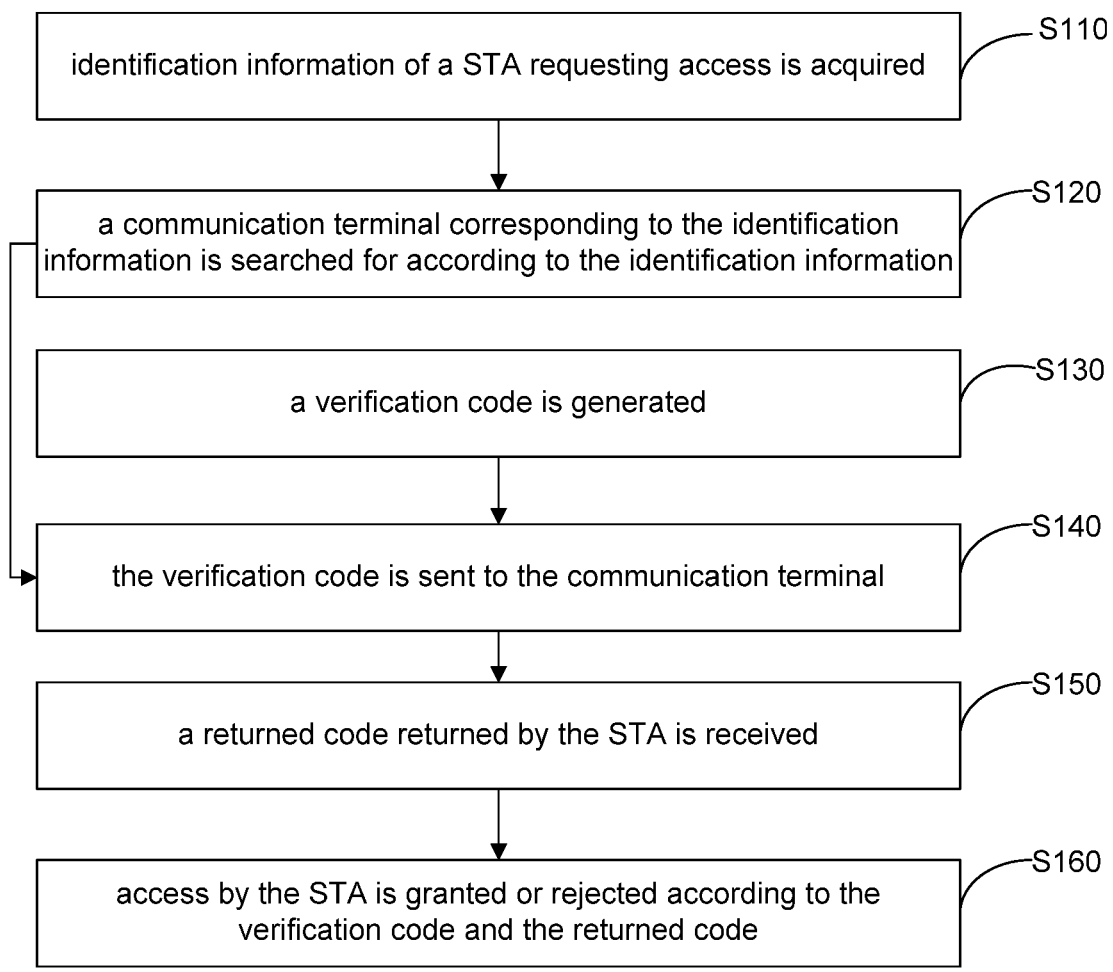
FIG. 1 is a flowchart of a method for wireless network access according to an embodiment herein.

As shown in FIG. 1, a method for wireless network access according to an embodiment herein includes steps as follows.

In step S110, identification information of a STA requesting access is acquired.

In step S120, a communication terminal corresponding to the identification information is searched for according to the identification information.

In step S130, a verification code is generated.

In step S140, the verification code is sent to the communication terminal.

In step S150, a returned code returned by the STA is received.

In step S160, access by the STA is granted or rejected according to the verification code and the returned code.

The identification information may be an identifier such as a MAC address. The identification information may be contained in a header of a data packet. The identification information may also be information such as a nickname of the STA.

The identification information may be acquired from a probe frame sent to wireless hotspot equipment AP by the STA. The identification information may also be sent to the AP by dedicated signaling.

The verification code may be a character string, such as a verification identifier serving for a verification function, formed by numbers, letters and/or various symbols. The verification code in step S130 may be generated dynamically and randomly. Different communication terminals may receive different verification codes at the same time.

A tablet of user A may wish to access a wireless AP1. If the tablet is a legal STA, a verification code will be sent to a communication terminal, such as a mobile phone A, bound with a MAC address corresponding to the tablet. The tablet may receive a returned code input by the user, and send the returned code to the AP1. If the user has learned the returned code from the mobile phone A, then the returned code will be the same as the verification code. This will lead to a successful verification. Otherwise the returned code may not match the verification code and the verification may fail.

A mobile phone of a user B attempting to access the AP1 may steal the identification information of the tablet, such as the MAC address. However, the mobile phone A of the user A is unavailable to the user B. Therefore, the user B cannot learn the verification code, nor can user B perform subsequent verification. Thus, even if the legal MAC address of the tablet has been stolen by another user, the other user will not be able to access the AP1. Accordingly, illegal access, i.e., access by an illegal STA, may be intercepted successfully.

It may be seen that compared with existing solution of verification by a MAC address, the method herein may stop login of an illegal STA by sending and verifying a verification code, thereby increasing probability of blocking illegal access, enhancing security in wireless network resource utilization.

In step S160, granting access by the STA may be understood as allowing the STA to exchange data, such as to initiate a data service, with other equipment using network bandwidth resources of the AP; rejecting access by the STA may be understood as rejecting use of the network bandwidth resources of the AP by the STA to exchange data, such as to initiate a data service, with other equipment.

The step S120 may include steps as follows.

It may be determined, according to the identification information, whether the STA is a legal STA.

When the STA is a legal STA, the communication terminal bound with the identification information may be searched for according to the identification information.

Only the identification information of a legal STA may be recorded in the AP as being bound with a communication terminal.

In step S120, before searching for the communication terminal, it may first be determined whether the STA is a legal STA that is authorized to access the AP. This is advantageous compared to direct search, which may lead to a situation where a result that no communication terminal is found is returned only after the AP has searched a large amount of data. In this way, it is possible to reject illegal access identifiable based on identification information thereof, thereby reducing workload as well as power consumption of the AP.

A binding relationship between the identification information (such as the MAC address) of a legal STA and a communication terminal may be pre-stored in the AP or a storage medium that the AP may access in real time.

The binding relationship may be in form of a mapping table. Identification information, such as a legal MAC address, and a communication identifier of a communication terminal may be recorded in the mapping table. The communication identifier may be a phone number or a number of a cell phone. The communication identifier may also be an identifier, such as a WeChat ID, a Fetion ID, etc., of a communication application that runs on the communication terminal.

An illegal STA may acquire the identification information of a legal STA by intercepting communication between the AP and the legal STA or by some other illegal means. However, it is difficult for an illegal user to get a hold of a communication terminal corresponding to the legal STA. Having sent a verification code to the communication terminal bound with the identification information, the AP may wait for a returned code returned by the STA requesting access. If the returned code matches the verification code, the STA requesting access may be deemed to have acquired the verification code from the communication terminal, and be a legal STA.

A client station (STA) may position itself by scanning a beacon frame sent by the AP, access the AP, and may access a wireless network through the AP. To access the wireless network, the STA may send a probe frame to the AP. Identification information such as a MAC address may be contained in the probe frame and sent. Therefore, step S110 may include that: the AP receives the probe frame, and extracts the identification information contained in the probe frame.

After extracting the identification information, the AP may determine whether the STA is legal based on the identification information.

During wireless access by a STA, the AP may have to send a probe response frame to the STA. According to an IEEE communication protocol, authentication and association between the STA and the AP may have to be performed before a wireless connection between the STA and the AP can be established. Step S120 may be performed any time before the AP grant access of the STA. However, in order to determine whether the STA requesting access is a legal STA as soon as possible, and reduce useless operation and operating load of the AP, the determination of whether the requesting STA is legal in S120 may be performed before the AP sends the probe response frame. After the requesting STA is determined to be legal, the probe response frame may be sent to the STA requesting access. This may save useless operations such as the discovery, authentication, and association between the STA and the AP executed via information exchange before the STA is found to be of an illegal user.

It may be determined whether a STA requesting access is legal based on a MAC address of any legal STA stored in the AP or a storage medium that the AP may access anytime. In view of this, step S120 may include steps as follows.

After the probe frame is received, it may be determined whether the identification information of the STA requesting access matches legal identification information. For example, it may be determined whether the MAC address of the STA requesting access matches a legal MAC address.

When the identification information matches the legal identification information, it may be determined that the STA is legal.

When the identification information matches no legal identification information, it may be determined that the STA is of an illegal user.

It has been further illustrated, based on the technical solution previously described, how to determine whether a STA requesting access is a legal STA, implementation of which is simple and fast.

Step S160 may be implemented in at least two modes as follows.

In Mode 1, step S160 may include steps as follows.

Access by a STA may be granted or rejected according to a verification code and a returned code as follows.

It may be determined whether the returned code matches a verification code.

When the returned code matches at least one verification code, access by the STA may be granted.

Step S160 may also include a step as follows.

When the returned matches no verification code sent to any of the communication terminal, access by the STA may be rejected.

The AP may generate a verification code for each STA requesting access. Access by a STA requesting access may be granted only when a returned code returned by the STA matches a verification code sent to a communication terminal corresponding to the STA.

With Mode 1, in case both STA1 and STA2 are legal STAs, assume that a communication terminal bound with the MAC address of the STA1 has received a verification code 01101, and a communication terminal bound with the MAC address of the STA2 has received a verification code 01034. In executing step S160 by the AP, the STA1 is allowed to access the AP only when the STA1 returns a returned code 01101 to the AP. If the STA1 returns a returned code 01034 to the AP, the STA2 will not be allowed to access the AP even though 01034 is one of the verification codes sent by the AP, as the verification code 01034 has been sent to the communication terminal bound with the MAC address of the STA2.

With the Mode 1, it is very difficult for an illegal user to acquire both the address of a legal STA and a verification code corresponding to the legal STA, greatly increasing difficulty in illegal access of a wireless network by an illegal user.

In Mode 2, step S160 steps as follows.

It may be determined whether the returned code matches a verification code.

When the returned code matches at least one verification code, access by the STA may be granted.

When the returned matches no verification code sent to any of the communication terminal, access by the STA may be rejected.

The AP may simultaneously send 10 verification codes to multiple STAs requesting access. A STA requesting access is legal when a returned code returned by the STA matches one of the 10 verification codes, without further determining whether the returned code is of the STA. This may simplify AP operation.

With the Mode 2, in case both STA1 and STA2 are legal STAs, assume that a communication terminal bound with the MAC address of the STA1 has received a verification code 01101, and a communication terminal bound with the MAC address of the STA2 has received a verification code 01034. In executing step S160 by the AP, the STA1 is allowed to access the AP whenever the STA1 returns a returned code 01101 or 01034 to the AP.

The AP will record a verification code sent by the AP per se. In the first mode, the AP must record a relationship between a STA requesting access and a verification code. When determining whether a returned code matches a verification code, the AP has to probe both an identifier (such as a MAC address) of the STA and a verification code to determine a final result of the verification. In the second mode, the AP may record but any verification code sent. After receiving a returned code, the AP may simply search the recorded any verification code for a match, which simplifies AP operation.

No matter which mode is adopted in step S160, assuming that a verification code is an 8-bit binary sequence, there may be 256 possible verification codes. It is difficult for an illegal STA to spot which one binary sequence as the actual verification code. A verification code is not limited to the form of a binary sequence, but may also include any other letter, number, symbol, and/or picture. This further increases difficulty for the illegal STA to acquire a verification code.

With either mode in S160, a same verification code may be used in multiple accesses by a STA. For example, a STA may use a verification code having been used last time the STA accessed the AP. The AP may send a same verification code to different communication terminals bound with the STA. That is, there is no certain order in executing step S130 and step S110, as long as both step S130 and step S110 are executed before step S140.

A verification code is used only when verifying whether access is granted. Even if a verification code is used for multiple accesses by a legal STA or for access by multiple legal STAs, it is still difficult for an illegal STA to acquire the verification code by intercepting information exchanged between a legal STA and the AP. A verification code may be generated dynamically at each STA access request, so as to minimize possibility of illegal access.

To sum up, due to lack of access to a communication terminal corresponding to identification information of a STA requesting access, and thus lack of access to a verification code, an illegal user is prevented from accessing an AP easily and stealing a wireless network resource.

To further enhance security of legal access and reduce probability of illegal access, improvements may be made as follows.

Figure 2:
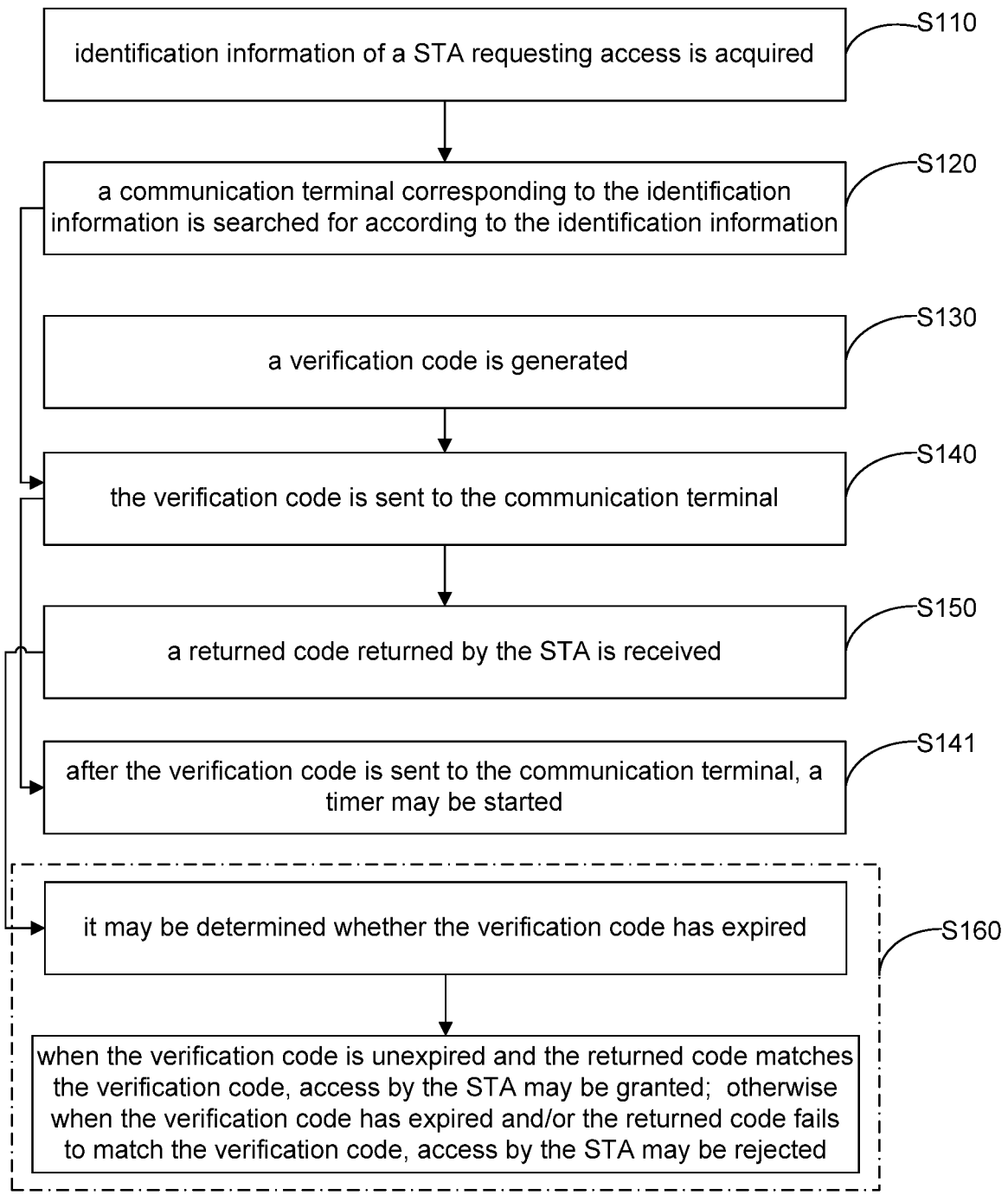
FIG. 2 is a flowchart of a method for wireless network access according to an embodiment herein.

As shown in FIG. 2, the method may further include steps as follows.

In step S141, after the verification code is sent to the communication terminal bound with the identification information, a timer may be started. The verification code may expire when a specified period of time expires.

Step S160 may include steps as follows.

It may be determined whether the verification code has expired.

When the verification code is unexpired and the returned code matches the verification code, access by the STA may be granted. Otherwise when the verification code has expired and/or the returned code fails to match the verification code, access by the STA may be rejected.

The verification code may expire after the specified period of time, such as 1 minute, 30 seconds, etc. The specified period of time may be determined depending on how long it takes to perform the specific operation.

It is difficult for an illegal user to get a hold of a communication terminal bound with legal identification information. Thus it is very difficult for the illegal user to steal a verification code. In addition, a verification code may expire or lapse after a valid period of time. This makes it even more difficult for the illegal user to steal the verification code within the relatively short period of time. With the method for wireless network access according to the embodiment, illegal accesses may be reduced greatly, reducing chance of wireless resource theft, enhancing security in wireless network access.

A verification code may be used for a limited number of times. For example, a verification code may be used once for verification, and may automatically lapse (lose its effectiveness) after a successful verification.

In steps S130-S140, verification codes generated by the AP for different STAs may or may not be the same. To simplify AP processing, verification codes generated at the same time may be identical.

Step S140 may include steps as follows.

A communication identifier of a communication terminal may be searched for according to a MAC address.

The verification code may be sent to the communication terminal according to the communication identifier.

If a STA requesting access is found to be illegal, access by the STA may be rejected straightforwardly, such as by blocking a subsequent flow of wireless access.

Step S140 may include that a short message containing the verification code may be sent to the communication terminal.

Relatively speaking, among existing communication technologies, a Short Message Service (SMS) is highly secure. A data format used for wireless network access is different from a data format of a short message. An ordinary illegal STA may not be able to intercept information in the two data formats within a short period of time and log into the AP using a legal MAC address and a corresponding verification code.

Device Embodiment 1

Figure 3:
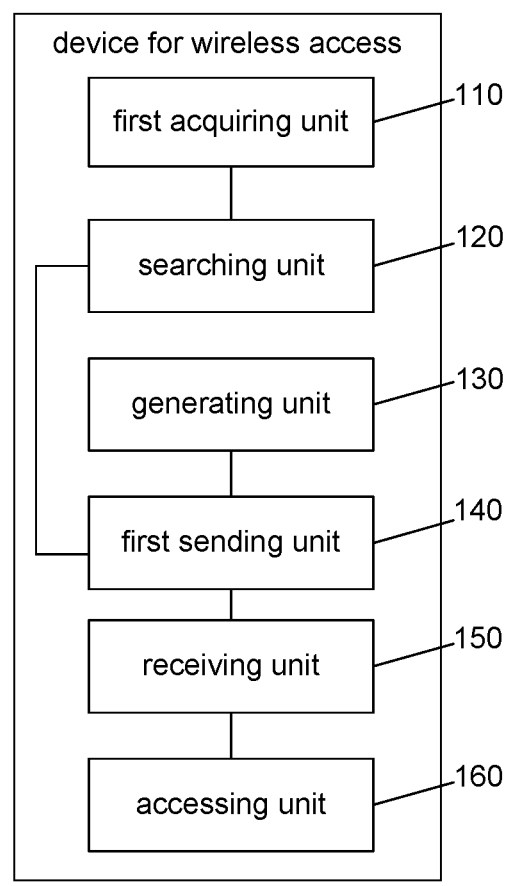
FIG. 3 is a diagram of a structure of a device for wireless network access according to an embodiment herein.

As shown in FIG. 3, a device for wireless network access according to the embodiment includes a first acquiring unit, a searching unit, a generating unit, a first sending unit, a receiving unit, and an accessing unit.

The first acquiring unit 110 is arranged for: acquiring identification information of a station (STA) requesting access. The identification information may include a MAC address or a nickname of the STA.

The searching unit 120 is arranged for: searching, according to the identification information, for a communication terminal having a binding relationship with the identification information.

The generating unit 130 is arranged for: generating a verification code, such as when the STA is legal.

The first sending unit 140 is arranged for: sending the verification code to the communication terminal.

The receiving unit 150 is arranged for: receiving a returned code returned by the STA.

The accessing unit 160 is arranged for: granting or rejecting, according to the verification code and the returned code, access by the STA.

The first acquiring unit 110 may have different structures depending on a mode in which the identification information is acquired. If the identification information sent by the STA is received, the first acquiring unit 110 may include a communication interface. In general, the communication interface may be a wireless interface, such as a receiving antenna, etc.

A structure of the searching unit 120 as well as that of the generating unit 130 may include various types of processors or processing chips. Such a processor or processing chip may serve for information processing. Such processors may include an application processor, a Central Processing Unit (CPU), a Microprocessor Unit (MPU), a Digital Signal Processor (DSP), a programmable array, etc. The searching unit 120 and the generating unit 130 may be separate processors or be integrated in one processor. When one processor corresponds to multiple aforementioned units, functions of different units may be implemented respectively via time division multiplexing or concurrent threads.

A structure of the first sending unit 130 as well as that of the receiving unit 140 may include a communication interface, such as a transceiver antenna, a WIFI antenna, etc.

The accessing unit 160 may include wireless network connecting equipment, such as a wireless connecting port, etc.

The device for wireless network access according to the embodiment may be a device capable of entering a wireless network, such as a wireless router, a wireless interaction machine, or the like, and provide hardware for implementing the method for wireless network access according to Method Embodiment 1. With the device for wireless network access, probability of illegal access can be reduced.

The searching unit 120 may include a determining module and a searching module.

The determining module may be arranged for: determining, according to the identification information, whether the STA is a legal STA.

The searching module may be arranged for: in response to determining that the STA is a legal STA, searching, according to the identification information, for the communication terminal corresponding to the identification information.

The determining module and the searching module may be integrated in one processor or may correspond to different processors.

The accessing unit 160 may grant or reject access by the STA in at least two modes. Accordingly, the accessing unit 160 may include at least two structures as follows.

The accessing unit 160 with a first structure may include a first matching module and a first accessing module.

The first matching module may be arranged for: determining whether the returned code matches the verification code sent to the communication terminal corresponding to the STA requesting access.

The first accessing module may be arranged for: in response to determining that the returned code matches the verification code, granting access by the STA. The first accessing module may be further arranged for: in response to determining that the returned code does not match the verification code, rejecting access by the STA.

The accessing unit 160 with a second structure may include a second matching module and a second accessing module.

The second matching module may be arranged for: determining whether the returned code matches a verification code.

The second accessing module may be arranged for: in response to determining that the returned code matches at least one verification code, granting access by the STA. The second accessing module may be further arranged for: in response to determining that the returned matches no verification code sent to any of the communication terminal, rejecting access by the STA.

Both the first matching module and the second matching module may include a comparator or a processor with a comparing function. Both the first accessing module and the second accessing module may correspond to wireless network connecting equipment, such as a wireless connecting port, etc. The wireless connecting port may be connected to the comparator or the processor with the comparing function. After receiving a signal sent by the comparator or the processing with the comparing function, the wireless connecting port may establish a connection between the AP and the STA to allow access by the STA, or establish no connection between the AP and the STA and reject access by the STA.

Figure 4:
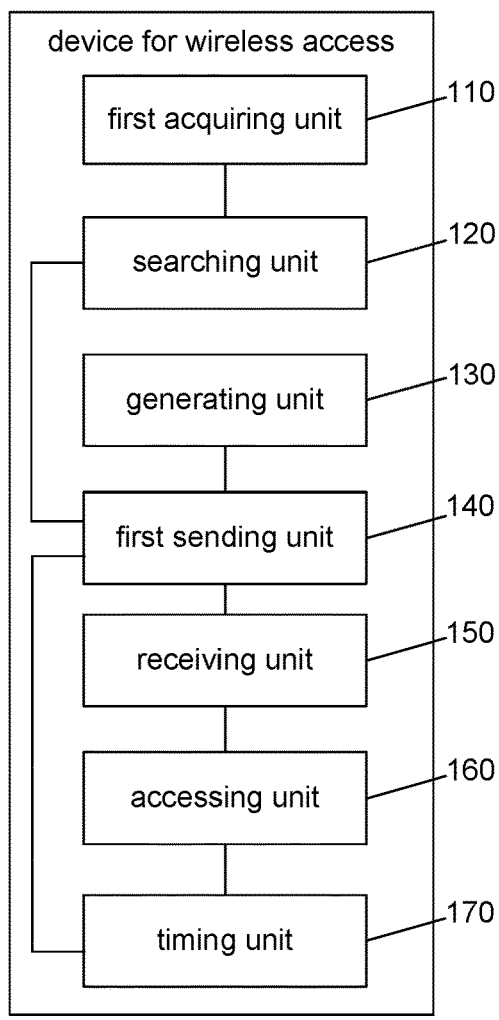
FIG. 4 is a diagram of a structure of a device for wireless network access according to an embodiment herein.

As shown in FIG. 4, the device may further include a timing unit.

The timing unit 170 may be arranged for: after sending the verification code to the communication terminal bound with the MAC address, starting a timer. The verification code may expire when a specified period of time expires.

The accessing unit 160 may be arranged for: determining whether the verification code has expired; in response to determining that the verification code is unexpired and that the returned code matches the verification code, granting access by the STA; otherwise in response to determining that the verification code has expired and/or that the returned code fails to match the verification code, rejecting access by the STA.

The timing unit 170 may include a timer arranged for timing. The AP may determine whether a verification code has expired according to timing of the timer.

The first acquiring unit 110 may be arranged for: receiving a probe frame sent by the STA, and extracting the MAC address contained in the probe frame. The first acquiring unit 110 may include a communication interface.

The searching unit 120 may be arranged for: after receiving the probe frame, determining whether the identification information matches legal identification information; in response to determining that the identification information matches the legal identification information, determining that the STA is legal; in response to determining that the identification information matches no legal identification information, determining that the STA is illegal.

The first sending unit 140 may be arranged for: sending the communication terminal a short message containing the verification code.

To sum up, with the method for wireless network access according to the embodiment, access by a STA may be implemented, greatly reducing illegal access, enhancing security in wireless network access, reducing probability of wireless resource theft.

Method Embodiment 2

Figure 5:
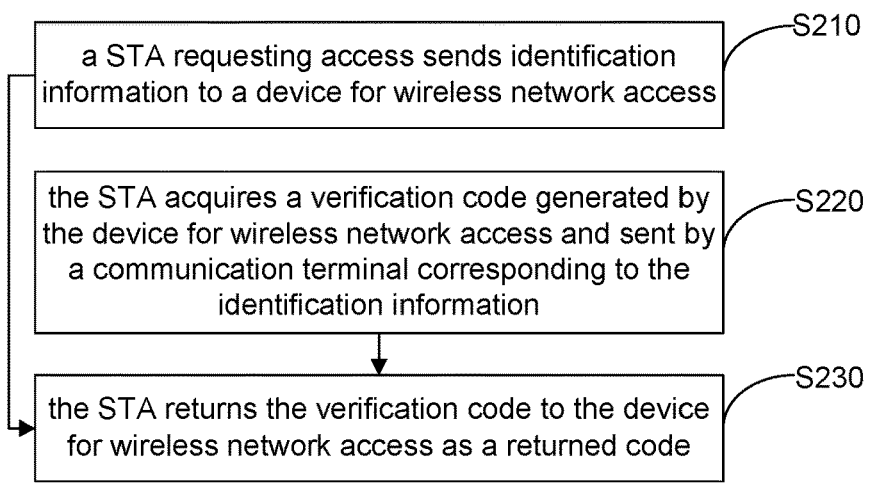
FIG. 5 is a flowchart of a method for wireless network access according to an embodiment herein.

As shown in FIG. 5, a method for wireless network access according to the embodiment includes steps as follows.

In step S210, a STA requesting access sends identification information to a device for wireless network access. The identification information may include a MAC address or a nickname of the STA.

In step S220, the STA acquires a verification code generated by the device for wireless network access and sent by a communication terminal corresponding to the identification information.

In step S230, the STA returns the verification code to the device for wireless network access as a returned code.

The device for wireless network access grants or rejects access by the STA according to the returned code.

The STA may be any terminal capable of accessing a wireless network. The communication terminal may be any terminal that performs wireless communication, such as a cell phone. The STA and the communication terminal may or may not be the same equipment.

One may refer to Method Embodiment 1 for composition of a verification code, which will not be repeated here.

The verification code acquired in step S220 may be input by a user manually or acquired from the communication terminal. When the communication terminal and the STA correspond to the same physical device, the verification code may be acquired automatically.

When a verification code acquired by a communication terminal requesting access may be used for accessing the AP repeatedly, step S220 may be performed before step S210, or steps S220 and S210 may be executed at the same time. When a verification code is for accessing the AP just once, step S220 may be performed after step S210. Therefore, there is no certain order in executing step S210 and step S220, as long as both steps are executed before step S230.

To sum up, according to the embodiment, to access the device for wireless network access, the STA requesting access not only has to have identification information identified as usual, but also has to return a returned code to the AP. The STA may be granted of access only when the returned code matches a corresponding verification code, thereby preventing an illegal STA from accessing the wireless network.

Device Embodiment 2

Figure 6:
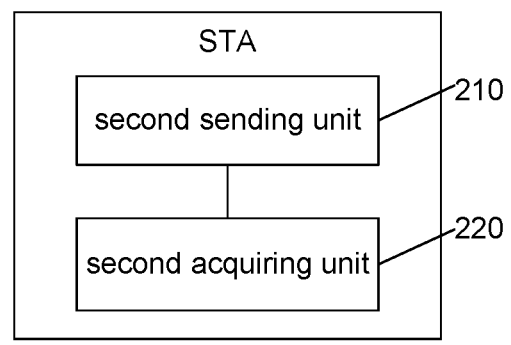
FIG. 6 is a diagram of a structure of a STA according to an embodiment herein.

As shown in FIG. 6, a STA according to the embodiment includes a second sending unit and a second acquiring unit.

The second sending unit 210 is arranged for: sending identification information of the STA to a device for wireless network access.

The second acquiring unit 220 is arranged for: acquiring a verification code generated by the device for wireless network access and sent by a communication terminal corresponding to the identification information.

The second sending unit 220 is further arranged for: returning the verification code to the device for wireless network access as a returned code.

The device for wireless network access grants or rejects access by the STA according to the returned code.

One may refer to the first sending unit for a structure of the second sending unit 230, which will not be repeated here. The second acquiring unit may be a receiving interface, such as a receiving antenna or a cable receiving interface. The second acquiring unit may be a man-machine interaction interface.

To sum up, the STA may be electronic equipment serving for a wireless network access function, such as a cell phone, a tablet, an e-Book/Kindle, etc., and provide hardware for implementing the method according to Method Embodiment 2.

Application examples will be provided below with reference to a method/device embodiment.

Figure 7:
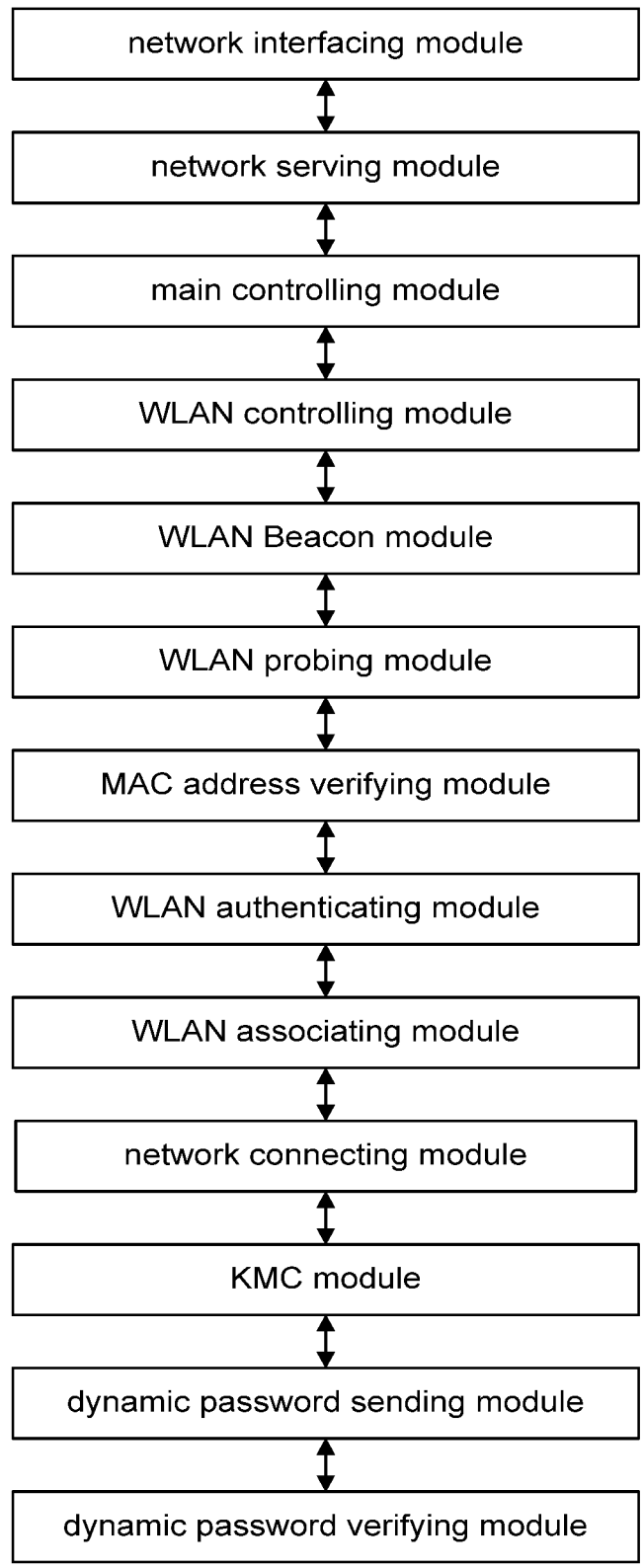
FIG. 7 is a diagram of a structure of a device for wireless network access according to an example herein.

As shown in FIG. 7, a device for wireless network access according to an example may include: a network user-interface module, a network serving module, a main controlling module, a WLAN controlling module, a WLAN Beacon module, a WLAN probing module, a WLAN authenticating module, a WLAN associating module, a network connecting module, a MAC address verifying module, a Key Management Center (KMC) module, a dynamic password sending module, and a dynamic password verifying module.

The network user-interface module may be a page for interaction between a user and a data terminal. With the page, the user may perform an operation, such as selecting a mode of network connection, searching a phone book, sending a short message, etc.

The network serving module may include background processing of a network service interface WEB UI, which is mainly for processing various requests of the user.

The two modules may be mainly arranged for an administrator or user of the device for wireless network access to perform information interaction and information processing on the device for wireless network access. Data transmission and data exchange between the network user-interface module and the network serving module may be based on a HyperText Transfer Protocol (HTTP).

The main controlling module, being that of the data terminal, may be arranged for: maintaining a state machine of the data terminal, and controlling functional modules, such as network connection, phone book, SMS, etc., according to different messages.

The WLAN controlling module may be arranged for: implementing a function such as scanning, authentication, association, etc., under the WLAN.

The WLAN Beacon module may be arranged for: broadcasting a Beacon frame periodically, to inform a nearby STA of a supported rate, a channel, a Services Set Identity (SSID) of the AP, etc.

The WLAN probing module may be arranged for: sending a probe response frame in response to a probe request frame of the STA.

The WLAN authenticating module may be arranged for: sending an authentication response frame in response to an authentication request frame (i.e., an authentication frame) of the STA.

The WLAN associating module may be arranged for: sending an association request response in response to an association request frame of the STA.

The network connecting module may be mainly arranged for: after the STA is associated with the AP successfully, controlling whether the STA is allowed to access the Internet.

The MAC address verifying module may be arranged for: verifying a MAC address, and determining whether the MAC address of the STA is of a legal user.

The KMC module may be a dynamic password managing module, and may be hardware or software for generating a dynamic password.

The dynamic password sending module may be arranged for: before the STA initiates a data-service connection, sending a short message containing a dynamic password to a communication terminal corresponding to a security number bound with the MAC address.

The dynamic password verifying module may be arranged for: verifying the dynamic password.

The AP may grant or reject access by the STA based on a result given by the dynamic password verifying module.

The MAC address authenticating module may be part of a determining unit in a device embodiment, and may be mainly arranged for: verifying whether a STA requesting access is legal.

The KMC module may be part of the generating unit in a device embodiment, and may be arranged for: generating a first verification code. The first verification code may be the dynamic password in the example.

The dynamic password sending module may be part of the first sending unit in a device embodiment.

The dynamic password verifying module may be part of the accessing unit in a device embodiment, and may correspond to the first matching module or the second matching module.

The network connecting module may also be deemed as part of the access unit in a device embodiment, and may be arranged for: grant or reject accessing the AP by the STA. The network connecting module may correspond to the first accessing module or the second accessing module.

Figure 8:
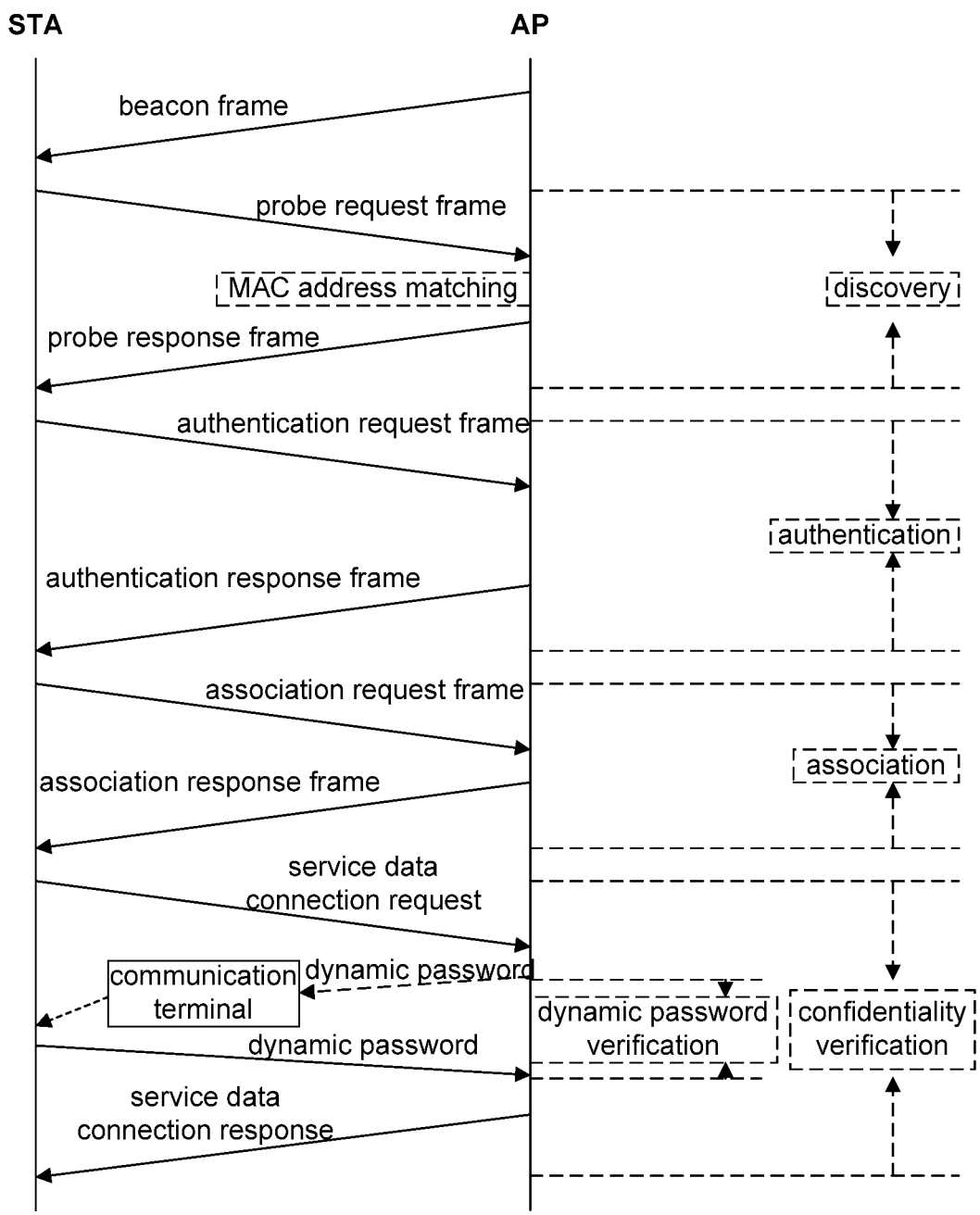
FIG. 8 is a flowchart of a wireless access method according to an example herein.

FIG. 8 is an example of the method according to an embodiment herein.

The example may include four stages, namely, discovery, authentication, association, and confidentiality verification.

The stage of discovery may include steps as follows.

The AP may send a beacon frame.

The STA may receive the beacon frame. To access the AP, the STA may send a probe request frame to the AP. The probe request frame may contain a MAC address of the STA.

After receiving the probe request frame, the AP may perform MAC address matching to determine whether the STA is legal.

When the STA is legal, the AP may send a probe response frame to the STA.

The STA may receive the probe response frame.

The stage of authentication may include steps as follows.

According to a communication protocol of IEEE, the STA will also receive authentication ciphertext sent by the AP. The STA may decipher the received authentication cryptograph sent by the AP using a password known to the STA, and generate plaintext corresponding to the ciphertext. The plaintext may be included in an authentication request frame, which then may be sent to the AP.

The AP may receive the authentication request frame and determine whether the plaintext is correct. If it is correct, the AP may send an authentication response frame to the STA.

The stage of association may include steps as follows.

After receiving the authentication response frame, the STA may send an association request frame to the AP. The association request frame may include an access-associated parameter associated with wireless network access, such as an SSID, a monitoring interval, a supported rate, etc.

After receiving the association request frame, the AP may perform association between the STA and the AP to establish a connection between the STA and the AP. A parameter such as result of interception will be acquired according to the access-associated parameter, so as to maintain a fair wireless connection between the STA and the AP.

After a connection between the STA and the AP is established, the AP may send an association response to the STA. The STA may then initiate data service connection with the AP.

The stage of confidentiality verification may include steps as follows.

When receiving the data service connection request, the AP will generate a dynamic password, and send the dynamic password to a communication terminal having a binding relationship with the STA. If the STA is legal, the STA will acquire the dynamic password indirectly.

The AP may receive the dynamic password sent by the STA and perform dynamic password verification.

If the dynamic password is verified, a service data connection between the STA and the AP may be established. The AP may send a service data connection response to the STA to implement access of the AP by the STA.

The STA requesting access and the communication terminal may correspond to one physical terminal, such as a cell phone. The cell phone may be a terminal supporting wireless Internet access, such as a communication terminal supporting WIFI. The cell phone may receive a short message.

An example 3 may include steps as follows.

In a first step, a device for wireless access may be powered on and initialized. A main control process may read a Wi-Fi configuration item to decide whether to call a Wi-Fi process.

In a second step, if the Wi-Fi configuration item is closed, no Wi-Fi process may be called. In this case, the device for wireless access may work in a modem mode.

In a third step, if the Wi-Fi configuration item is opened, the Wi-Fi process is called. In this case, data terminal may work in a modem&wi-fi mode.

In a fourth step, the Wi-Fi process may call a function wifi_ap_whitename_read( ), update a file ap_whitename.xml. The function wifi_ap_whitename_read( ) may serve for the Wi-Fi process to read legal identification information, and may be, for example, a function for reading the legal MAC address. The Wi-Fi process is for Wi-Fi processing. One may refer to prior art for specific content of the process. The whitename may represent the legal identification information.

In a fifth step, a WEB SERVER process may call a function web_server_whitename_read( ), and read the xml file. The function web_server_whitename_read( ) may serve for the WEB SERVER process to read the legal identification information, and may be for example, a function for reading the legal MAC address. One may refer to prior art for specific content of the process.

In a sixth step, a network interface WEB UI process may call a function web_ui_whitename_show( ) to read the xml file, and display the information on the network user interface. The function web_ui_whitename_show( ) may serve for the WEB UI process to display the legal identification information, and may be for example, a function for reading the legal MAC address. The WEB UI process is for processing WEB UI. One may refer to prior art for specific content of the process.

In a seventh step, a network administrator may log in to the WEB UI, and add a whitelist allowed of access. The WEB UI process may transmit the information to the WEB SERVER process through an HTTP request. The whitelist may include a legal MAC address.

In an eighth step, the WEB SERVER process may transmit the information to the Wi-Fi process via message queuing.

In a ninth step, the Wi-Fi process may call a function wifi_ap_whitename_write( ) to write the information into the file ap_whitename.xml. The function wifi_ap_whitename_write( ) may serve for the Wi-Fi process to modify the legal identification information.

In a tenth step, the Wi-Fi process may call a function wifi_ap_beacon_broadcast( ), to inform a nearby STA periodically of an SSID, a channel, a supported rate per se, etc. The function wifi_ap_beacon_broadcast( ) may serve for the Wi-Fi process to broadcast the legal identification information.

In an eleventh step, to access the AP, the STA may select a corresponding SSID and input a WLAN password. In this case, the STA may send a probe request frame containing the information.

In a twelfth step, after the AP receives the frame, the Wi-Fi process may call a function wifi_ap_mac_filter( ) to check whether a current MAC address is legal. The function wifi_ap_mac_filter( ) may serve for the Wi-Fi process to check whether the current MAC address is legal. The function may also serve for a search for determining whether identification information of another type is legal.

In a thirteenth step, depending on a result of the twelfth step, if the STA requesting access is illegal, the AP may not respond to the probe request frame of the STA.

In a fourteenth step, depending on the result of the twelfth step, if the STA requesting access is legal, the Wi-Fi process may call a function wifi_ap_probe_response( ) to reply to the request frame. The function wifi_ap_probe_response( ) may serve for the Wi-Fi process to respond to the probe frame.

In a fifteenth step, after receiving the probe response frame, the STA may send an authentication frame.

In a sixteenth step, after the AP receives the frame, the Wi-Fi process may call a function wifi_ap_authentication_response( ) to respond to the frame and confirm that the authentication is successfully. The function wifi_ap_authentication_response( ) may serve for the Wi-Fi process to respond to the authentication frame.

In a seventeenth step, when receiving the authentication response frame, the STA may send an association request frame.

In a eighteenth step, after the AP receives the frame, the Wi-Fi process may call a function wifi_ap_association_response( ) to respond to the frame and confirm that the association is successfully. In this case, a connection between the STA and the AP may be established successfully. The function wifi_ap_association_response( ) may serve for the Wi-Fi process to associate the AP and the STA.

In a nineteenth step, when the STA initiates a data service connection, a KMC process may call a function wifi_ap_dpwd_generate( ) to generate a dynamic password. The Wi-Fi process may call a function wifi_ap_dpwd_send( ). The AP may automatically send a short message to a security number bound with the MAC address. The short message may contain the dynamic password. The function wifi_ap_dpwd_generate( ) may serve for the Wi-Fi process to generate the dynamic password (which may be one type of verification code). The function wifi_ap_dpwd_send( ) may serve for the Wi-Fi process to send the dynamic password (which may be one type of verification code).

In a twentieth step, after a cell phone receives the short message, the STA may input the dynamic password on a secondary authentication page.

In a 21st step, the AP may receive the dynamic password. The Wi-Fi process may call a function wifi_ap_dpwd_check ( ) to verify the dynamic password. The function wifi_ap_dpwd_check( ) may serve for the Wi-Fi process to verify the dynamic password (which may be one type of verification code).

In a 22nd step, depending a result of the 21st step, if the dynamic password is not verified to be correct, the STA is refused to initiate the data service connection.

In a 23rd step, depending the result of the 21st step, if the dynamic password is verified to be correct, the STA is allowed to initiate the data service connection.

Figure 9:
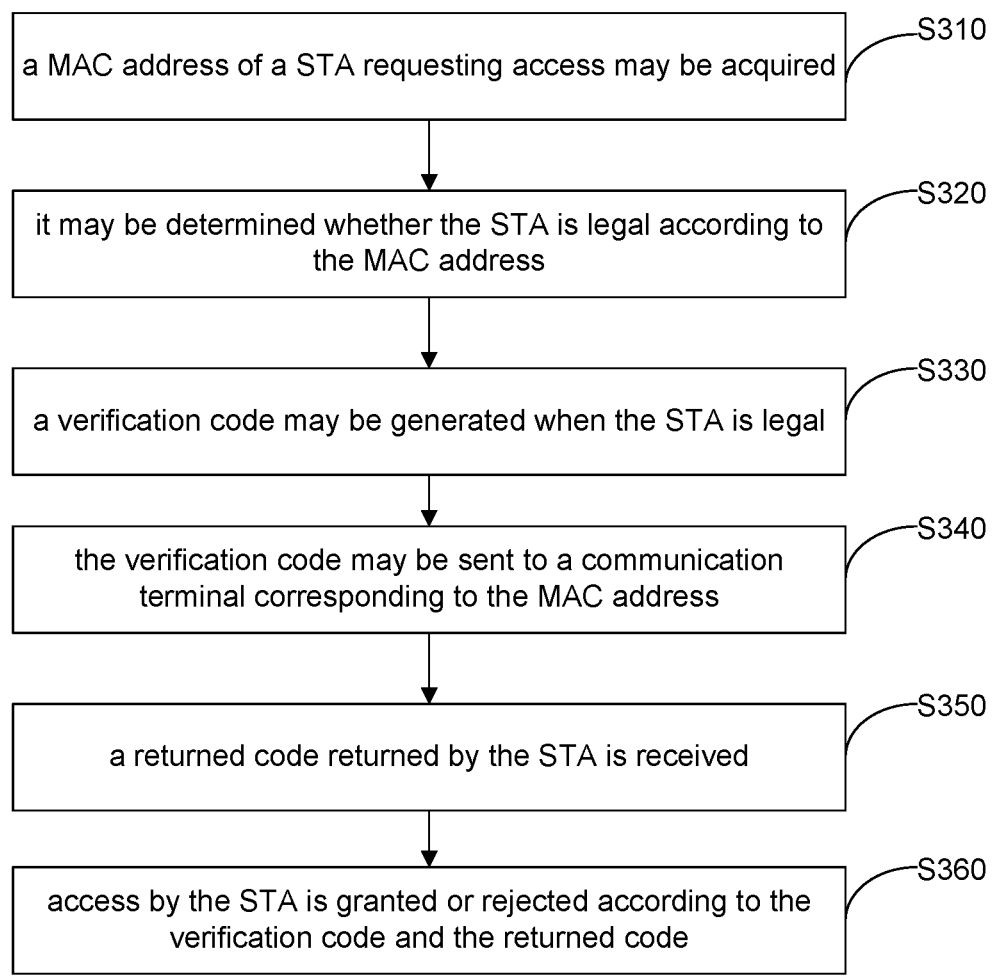
FIG. 9 is a flowchart of a wireless access method according to an example herein.

As shown in FIG. 9, a method for wireless network access according to an example may include steps as follows.

In step S310, identification information of a STA requesting access may be acquired. The identification information may be a MAC address.

In step S320, it may be determined whether the STA is legal according to the identification information.

In step S330, a verification code may be generated when the STA is legal.

In step S340, the verification code may be sent to a communication terminal corresponding to the identification information.

In step S350, a returned code returned by the STA is received.

In step S360, access by the STA is granted or rejected according to the verification code and the returned code.

Steps S310-S360 may all be executed by wireless access equipment AP, such as a wireless router or a wireless switch. By granting access by the STA, it means that the STA is allowed to acquire a network service using a network bandwidth of the AP. By rejecting access by the STA, it means that the STA is not allowed to acquire a network service using the network bandwidth of the AP.

A computer-readable storage medium according to an embodiment herein stores therein computer-executable instructions. The computer-executable instructions are for executing at least one aforementioned method, such as at least one method as shown in FIG. 1, FIG. 2, and FIG. 5.

The computer-readable storage medium may include various media capable of storing program codes, such as a mobile storage device, a Read-Only Memory (ROM), a Random Access Memory (RAM), a magnetic disk, an optical disk, etc. The computer-readable storage medium may be a non-transitory storage medium so as to store the program codes stably.

What described are merely embodiments of the present disclosure and are not intended to limit the scope of the present disclosure. Any modification made according to the principle of the disclosure shall fall within the scope of the present disclosure.

The invention claimed is:

1. A method for wireless network access, comprising:
    acquiring identification information of a station (STA) requesting access;
    searching, according to the identification information, for a communication terminal corresponding to the identification information;
    generating a verification code, and sending the verification code to the communication terminal;
    receiving a returned code returned by the STA; and
    granting or rejecting, according to the verification code and the returned code, access by the STA;
    wherein the searching, according to the identification information, for a communication terminal corresponding to the identification information comprises:
        determining, according to the identification information, whether the STA is a legal STA; and
        in response to determining that the STA is a legal STA, searching, according to the identification information, for the communication terminal corresponding to the identification information.

2. The method according to claim 1, wherein the acquiring the identification information of the STA comprises:
    receiving a probe frame sent by the STA; and
    extracting the identification information contained in the probe frame.

3. The method according to claim 2, wherein the determining, according to the identification information, whether the STA is a legal STA comprises:
    after receiving the probe frame, determining whether the identification information matches legal identification information;
    in response to determining that the identification information matches the legal identification information, determining that the STA is legal; and
    in response to determining that the identification information matches no legal identification information, determining that the STA is illegal.

4. The method according to claim 1, wherein the granting or rejecting, according to the verification code and the returned code, access by the STA comprises:
    determining whether the returned code matches the verification code; and
    in response to determining that the returned code matches the verification code, granting access by the STA.

5. The method according to claim 4, wherein the granting or rejecting, according to the verification code and the returned code, access by the STA further comprises:
    in response to determining that the returned code does not match the verification code, rejecting access by the STA.

6. The method according to claim 1, wherein the granting or rejecting, according to the verification code and the returned code, access by the STA comprises:
    determining whether the returned code matches any one of a plurality of verification codes; and
    in response to determining that the returned code matches at least one verification code of the plurality of verification codes, granting access by the STA.

7. The method according to claim 6, wherein the granting or rejecting, according to the verification code and the returned code, access by the STA further comprises:
    in response to determining that the returned code matches no verification code sent to any one of a plurality of the communication terminals, rejecting access by the STA.

8. The method according to claim 1, further comprising:
    after sending the verification code to the communication terminal, starting a timer, wherein the verification code expires when a specified period of time expires,
    wherein the granting or rejecting, according to the verification code and the returned code, access by the STA comprises:
        determining whether the verification code has expired; and
        in response to determining that the verification code is unexpired and that the returned code matches the verification code, granting access by the STA; otherwise in response to determining that at least one of the verification code has expired or the returned code fails to match the verification code, rejecting access by the STA.

9. The method according to claim 1, wherein the sending the verification code to the communication terminal comprises:
    sending the communication terminal a short message containing the verification code.

10. A device for wireless network access, comprising a communication interface, a processor and a wireless network connecting equipment, wherein
    the communication interface is arranged to acquire identification information of a station (STA) requesting access;
    the processor is arranged to search, according to the identification information, for a communication terminal corresponding to the identification information and generate a verification code;
    the communication interface is further arranged to send the verification code to the communication terminal and receive a returned code returned by the STA; and
    the wireless network connecting equipment is arranged to grant or reject, according to the verification code and the returned code, access by the STA;
    wherein the processor is further arranged to: determine, according to the identification information, whether the STA is a legal STA, and in response to determining that the STA is a legal STA, search, according to the identification information, for the communication terminal corresponding to the identification information.

11. The device according to claim 10, wherein the wireless network connecting equipment is further arranged to:
   determine whether the returned code matches the verification code; and
   in response to determining that the returned code matches the verification code, granting access by the STA.

12. The device according to claim 11, wherein the wireless network connecting equipment is further arranged to: in response to determining that the returned code does not match the verification code, rejecting access by the STA.

13. The device according to claim 10, wherein the wireless network connecting equipment is further arranged to:
   determine whether the returned code matches any one of a plurality of verification codes; and
   in response to determining that the returned code matches at least one verification code of the plurality of verification codes, granting access by the STA.

14. The device according to claim 13, wherein the wireless network connecting equipment is further arranged to: in response to determining that the returned code matches no verification code sent to any one of a plurality of the communication terminals, reject access by the STA.

15. The device according to claim 10, wherein
   the communication interface is further arranged to: send the communication terminal a short message containing the verification code.

16. A computer-readable storage medium, storing therein computer-executable instructions for executing a method for wireless network access, the method comprising:
   acquiring identification information of a station (STA) requesting access;
   searching, according to the identification information, for a communication terminal corresponding to the identification information;
   generating a verification code, and sending the verification code to the communication terminal;
   receiving a returned code returned by the STA; and
   granting or rejecting, according to the verification code and the returned code, access by the STA;
   wherein the searching, according to the identification information, for a communication terminal corresponding to the identification information comprises:
      determining, according to the identification information, whether the STA is a legal STA; and
      in response to determining that the STA is a legal STA, searching, according to the identification information, for the communication terminal corresponding to the identification information.

* * * * *